United States Patent [19]

Hankel et al.

[11] Patent Number: 4,605,308

[45] Date of Patent: Aug. 12, 1986

[54] CONTACTLESS RELATIVE MOVEMENT SENSOR

[75] Inventors: Rainer Hankel; Minh-Chanh Pham; Sieghart Peuser, all of Berlin, Fed. Rep. of Germany

[73] Assignee: Robert Bosch GmbH, Stuttgart, Fed. Rep. of Germany

[21] Appl. No.: 520,136

[22] Filed: Aug. 4, 1983

[30] Foreign Application Priority Data

Aug. 6, 1982 [DE] Fed. Rep. of Germany ....... 3229343

[51] Int. Cl.$^4$ ............................................. G01B 11/14
[52] U.S. Cl. .................................................. 356/373
[58] Field of Search ................................... 356/373, 28

[56] References Cited

U.S. PATENT DOCUMENTS

| | | | |
|---|---|---|---|
| 2,413,349 | 12/1946 | Hancock, Jr. et al. | 250/237 R |
| 2,878,713 | 3/1959 | Blackstone | 356/28 |
| 2,942,119 | 6/1960 | King et al. | 356/28 |
| 3,856,401 | 12/1974 | Heitmann et al. | 356/28 |
| 3,906,220 | 9/1975 | Delingat | 356/28 |
| 4,273,430 | 6/1981 | Fritsche et al. | 356/28 |

FOREIGN PATENT DOCUMENTS

| | | | |
|---|---|---|---|
| 2450439 | 4/1976 | Fed. Rep. of Germany | 356/28 |
| 0016273 | 7/1977 | Japan | 356/28 |
| 0974272 | 11/1982 | U.S.S.R. | 356/28 |

OTHER PUBLICATIONS

Ator, "Image Velocity Sensing with Parallel Slit Reticles", *J. of Op. Soc. of America*, vol. 53, No. 12, 12/63, pp. 1416-1422.
Ator, "Image Velocity Sensing by Optical Correlation", *Applied Optics*, vol. 5, No. 8, 8/66, pp. 1325-1331.
Kreutzer, "Theoretische Betrachtungen zur beruehrlosen Geshwindig-Kietsmessung mit optischen Gittern", *F&M, Feinwerktechnik & Messtechnik*, vol. 83, Issue 6, 1975.
Zomotor, "Ein Korrelationsoptisches Verfahren zur direkten Messung von Instationaeren Schwimm-und Schraeglaufwinkeln an Kraftfahrzeugen", *ATZ Automobiltechnische Zeitschrift*, vol. 77, Issue 7/8, 1975, pp. 213-218.
Arzt et al., "Optische Sensoren zur beruehrlosen und schlupffreien Weg-und Geschwindig Keits-Messung an Landfahrzeugen", *F&M, Feinwerktechnik & Messtechnik*, vol. 86, Issue 2, 3/78, pp. 69-71.

*Primary Examiner*—R. A. Rosenberger
*Assistant Examiner*—Crystal Cooper
*Attorney, Agent, or Firm*—Frishauf, Holtz, Goodman & Woodward

[57] ABSTRACT

The sensor is particularly suitable to determine movement between a ground vehicle or aircraft over a ground surface, and a portion of the reference surface (10) is imaged on a grid plane (12, 30, 40) which, in accordance with the invention, is formed as a photosensitive transducer, for example a plurality of photosensitive diodes formed on a single chip and suitably connected in a grid or matrix pattern, made, for example, by a planar process by monolithic integration. Correlation-optical measurement of relative movement thus is simplified, and precise grid structures can be readily made, the output signals from the individual photo-sensitive junctions being summed and, if interdigited grid structures are used, the so summed signals can then be subtracted from each other to eliminate ambient light, or slowly varying low-frequency components and derive only a movement signal. By arranging two or more such grid structures at an angle with respect to each other, vectorial movement directions and, by using four interdigited grids with phase comparison, forward-reverse direction of movement can also be sensed. Summing can be effected by connection of individual photo junctions or by bundling light guide fibers arranged in a matrix of a grid pattern, and conducting the fibers to common electro-optical transducers.

19 Claims, 7 Drawing Figures

CONTACTLESS RELATIVE MOVEMENT SENSOR

REFERENCE TO RELATED PUBLICATIONS

"Journal of the Optical Society of America", Vol. 53, No. 12, December 1963, pp. 1416 to 1422, article by J. T. Ator, entitled "Image-Velocity Sensing with Parallel-Slit Reticles".

"APPLIED OPTICS", Vol. 5, No. 8, August 1966, pp. 1325 to 1331, article by J. T. Ator, entitled "Image Velocity Sensing by Optical Correlation".

"F & M, Feinwerktechnik & Messtechnik", Vol. 86, Issue 2, March 1978, pp. 69 to 71 ("Precision Technology and Measuring Technology"), article by R. Arzt and H. Ringelhan, entitled "Optische Sensoren zur beruehrlosen und schlupffrein Weg- und Geschwindigkeits-Messung an Landfahrzeugen" ("Optical Sensors for Contactless and Slipfree Distance and Speed Measuring of Land Vehicles").

"F & M, Feinwerktechnik & Messtechnik", Vol. 83, 1975, Issue 6, pp. 289 to 294 ("Precision Technology and Measuring Technology"), article by P. Kreutzer, entitled "Theoretische Betrachtungen zur beruehrlosen Geschwindigkeitsmessung mit optischen Gittern" ("Theoretical Observations for Contactless Speed Measuring with Optical Grating").

ATZ Automobiltechnische Zeitschrift, Vol. 77, 1975, Issue 7/8, pp. 213 to 218, article by Dr.-Ing. Adam Zomotor, entitled "Ein korrelationsoptisches Verfahren zur direkten Messung von instationaeren Schwimm- und Schraeglaufwinkeln an Kraftfahrzeugen ("An Optical Correlation Method for the Direct Measurement of Transient Sideslip and Slip Angles of Motor Vehicles").

U.S. Pat. No. 2,413,349, HANCOCK et al.

The present invention relates to a sensor to determine relative movement of, for example, the sensor with respect to a reference surface, in which the reference surface has a statistically distributed roughness. Sensors of this type are used in combination with vehicles and, more specifically, to determine contactless movement of a sensor element with respect to a ground surface.

BACKGROUND

Sensors which are based on the correlation optical principle to determine movement are described in the referenced publications, and more specifically in "Journal of the Optical Society of America", Vol. 53, No. 12, December 1963, pp. 1416 to 1422, article by J. T. Ator, entitled "Image-Velocity Sensing with Parallel-Slit Reticles"; and "APPLIED OPTICS", Vol. 5, No. 8, August 1966, pp. 1325 to 1331, article by J. T. Ator, entitled "Image Velocity Sensing by Optical Correlation". The principle of movement sensing has been carried forward since these early investigations, and commercial structures made by the Leitz company of the Fed. Rep. Germany, and marketed under the trademarks "Correvit-L" and "Correvit-Q", are described in "F & M, Feinwerktechnik & Messtechnik", Vol. 86, Issue 2, March 1978, pp. 69 to 71 ("Precision Technology and Measuring Technology"), article by R. Arzt and H. Ringelhan, entitled "Optische Sensoren zur beruehrlosen and schlupffreien Weg- und Geschwindigkeits-Messung an Lanfahrzeugen" ("Optical Sensors for Contactless and Slipfree Distance and Speed Measuring of Land Vehicles").

Sensors of this type include an optical system in which a background surface, for example, is imaged over an optical system on a grid. The light flux which is passed by the grid or grating is collected by a field lens on one or two photoelectric transducers or receivers. The temporal course of the resulting electrical signal will then show a modulation in addition to low-frequency changes. The modulation frequency f has an unambiguous relationship with the speed v of the moving object, for example the sensor head.

Arrangements of this type have the disadvantage that the construction is complex and expensive, and requires two optical systems, in which one is located in advance of the grid and the other subsequent to the grid in the image plane. This results in problems during manufacture and in adjustment at a later time. Construction, use, and application, thus, are expensive.

THE INVENTION

It is an object to construct a sensor based on the physical principle of grid-imaging of a surface with statistically distributed roughness which requires only one optical system in the plane of the grid or of the image, so that the overall construction of the apparatus will be substantially simplified and hence can be made more inexpensively than heretofore possible.

Briefly, the grid or grating structure itself is formed as an electro-optical transducer structure; thus, the grid or grating structure can comprise electro-optical transducers arranged in a grid pattern and positioned in the grid plane.

In accordance with a feature of the invention, a substrate may be provided on which photo-responsive semiconductor elements, such as photo diodes or photo transistors, are constructed in accordance with, for example, planar technology.

In accordance with a preferred feature of the invention, the photo transducer is formed as diffusion zones in a strip or matrix pattern on a common semiconductor substrate. Thus, the grid or grating and the photo transducer are a single monolithically integrated constructional element. Such an arrangement permits wide freedom of design, with high accuracy of the grid or grating structure. Silicon-planar technology, which can be applied by any well-known process and with well-known apparatus, still permits construction of grids of high accuracy. Grid patterns which are complex and interdigited, for example, can readily be made by simple and well known methods.

Grid structures and grid patterns which permit sensing of movement, including vectorial movement, can readily be constructed by utilizing planar technology.

The system has the advantage that only well-known and standard technologies need be used and only one optical system is required, while providing the required output in an improved and more accurate manner.

DRAWINGS

DETAILED DESCRIPTION

Figure 1:
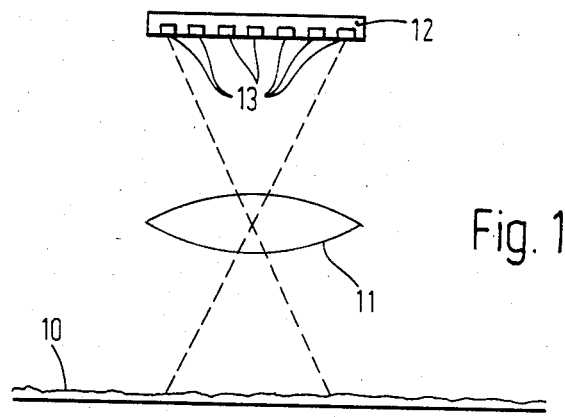
FIG. 1 is a schematic arrangement of the sensor in accordance with the invention.

The basic structure, with reference to FIG. 1: A reference surface 10, which has a statistically distributed roughness, is imaged by a lens system 11, schematically shown merely as a single lens, on a grid 12. The reference surface must have a statistically distributed structure, for example of the type which is formed by a road surface, if the sensor is to be used with a surface vehicle, or by the earth surface, if the sensor is to be used with an aircraft.

In accordance with the invention, the grid structure in the grid or image plane is formed by a grid-arranged photo-sensitive receiver 13. The photo receivers, which are arranged in a grid pattern, provide electrical signals which, besides low-frequency changes, will have superimposed thereon a modulation of a frequency f which has an unambiguous relation with the speed v of the sensor, comprising the components 11, 12, 13 with respect to the reference surface 10. The mathematical relation is expressed by:

$$f = M \cdot v / G \quad (1)$$

wherein M is the scale of imaging with which the reference surface 10 is imaged on the grid 12, and G is the grid constant of the grid 12.

If it is desired to determine the total displacement of the sensor structure 11-13 with respect to the surface 10, for example, during a predetermined period of time T, the signals during the time period $T = 1/f$ must be summed.

The principle of measurement as well as the evaluation of the respective signals are described in detail in the referenced publications.

Figure 2:
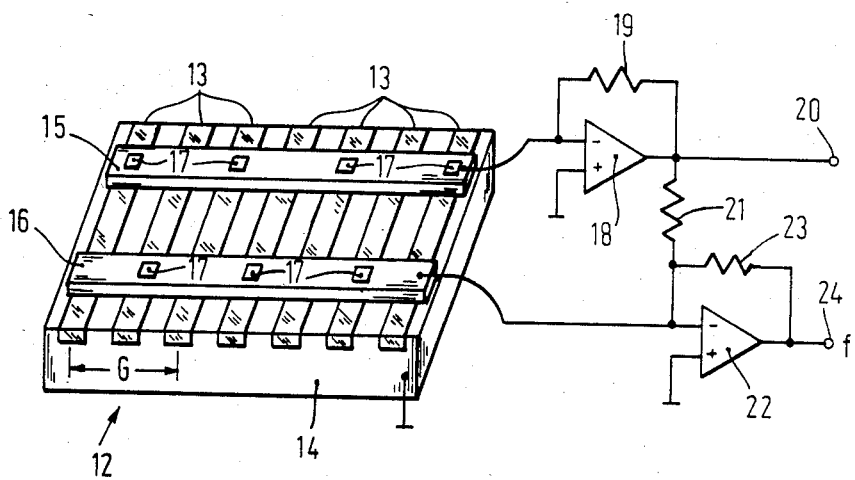
FIG. 2 is a schematic drawing of a photo-sensitive receiving structure with two comb-like interdigited grids.

Embodiment of FIG. 2: The monolithically integrated grid 12 is formed on a silicon substrate 14, of a first conductivity type; in one example, substrate 14 is n-conductive. The grid structure 13 is formed thereon in a pattern of strip-like diffusion zones of a second conductivity type, then p-conductive. p/n junctions are formed between the grid-diffusion strips 13 and the substrate. These junctions are formed as photo diodes. Rather than using photo diodes, photo transistors, or other photoelectric transducer elements may be used.

Two metallization strips 15, 16 are so applied over the diffusion zones—with suitable intervening insulation—that two interdigited comb-like diode structures result which have a grid constant G (see FIG. 2). The electrical connection of the metallized strips 15, 16 with the grid structure 13 is indicated by the squares 17, which correspond to contact windows in the oxide which is generated by the silicon-planar process.

The photo diodes in the arrangement shown in FIG. 2 have a common electrode, the substrate 14, in the form of the cathode. This arrangement does not permit subtraction of the photo currents to suppress the uniform light components by an anti-parallel circuit. The currents of the diodes which are connected by the metallized strips 15 are thus, respectively, applied to the inverting input of amplifiers 18, 22 which, respectively, have their outputs connected back to the inverting inputs over respective resistors 19, 23. The direct inputs of the amplifiers 18, 22, for example operational amplifiers, are connected to ground or chassis. The output of the amplifier 18 is connected to a first output terminal 20 and, with a coupling resistor 21, to the inverting input of the second amplifier 22, the output of which is connected to terminal 24, from which the frequency f can be derived.

Operation: Subtraction of photo currents is possible in this structure upon simultaneous short-circuit operation of the diodes of the grid structure 13. By subtraction, the portion of the ambient or general light which is generated by the grid is suppressed so that ony the filtered components which are due to the local spectrum are amplified. The voltage at the output of the amplifier 18 is directly proportional to the current of those diodes which are connected to the metallization 15, and will additionally depend on the value of the feedback resistor 19. The diodes connected to the metallized strip 16 supply current to the inverting input of the amplifier 22. The inverse feedback coupling of the amplifiers 18, 22 by the resistors 19, 23 is so arranged that the inverting inputs are held virtually at the voltage level zero or null. The connection of the output of the amplifier 18 with the input of the amplifier 22 over resistor 21 causes current to flow to the input of the amplifier 22. This current has exactly the negative value of the current which corresponds to the diodes which are coupled to the metallization 15, provided the resistors 19, 21 are selected to be of equal value. The output voltage at terminal 24—which is dependent on the value of resistor 23—is then proportional to the difference of the currents of the two metallizations 15, 16. The output terminal 20 will carry an amplified signal of the diodes coupled to the metallization strip 15. This signal, of course, will still contain the basic or ambient light component and may be used generally for light level evaluation, for example, or for other measurement purposes.

Figure 3:
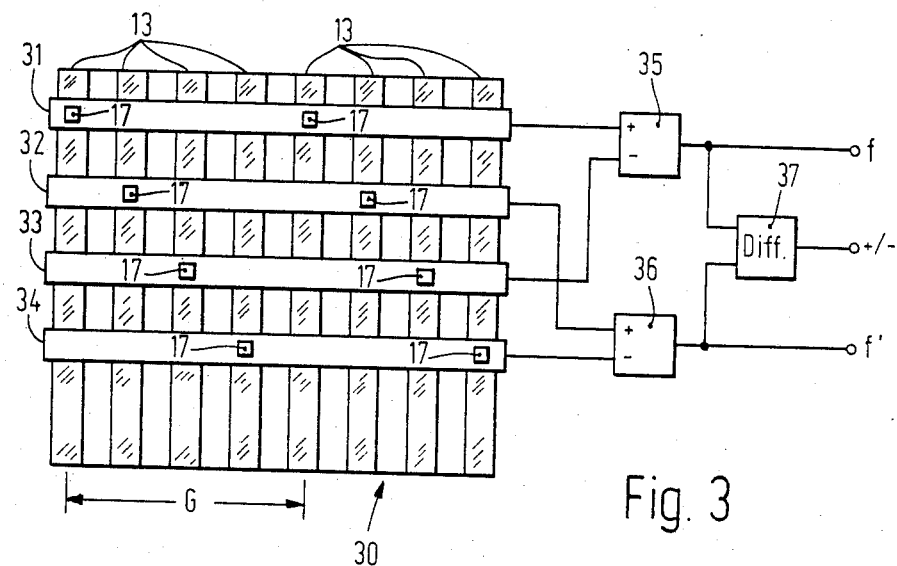
FIG. 3 is a schematic top view of a photo receiver structure in which four comb-like interdigited grids are used.

Embodiment of FIG. 3: The grid structure 30 again has grid strips 13 formed as strip-like diffusion zones to form junctions with a substrate. The diffusion zones are connected over four metallizing strips 31, 32, 33, 34 such that four interdigited grids will result. As shown in the drawings, every fourth diffusion strip of the grid structure 13 is offset with respect to one metallizing strip. The connection points, again, are shown by the rectangle 17. The metallizing strips 31 and 33 are connected with the first substracting stage 35; the metallizing strips 32, 34 are connected with the second substracting stage 36. As in FIG. 2, the respective diode currents are subtracted. Stages 35, 36 may be similar to the amplifier circuit 18-23 of FIG. 2. The two output frequencies f and f' (FIG. 3) are phase-shifted with respect to each other and are applied to a phase difference stage 37. By forming a difference, the sign, and hence the direction of the single dimensional movement, can be sensed, by respectively analyzing the phase of the frequencies f, f' in the differentiating circuit 37.

Figure 4:
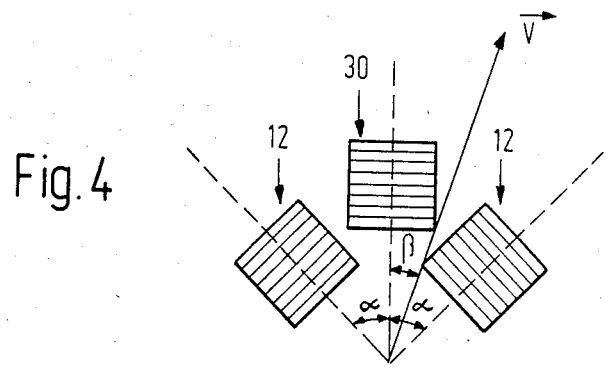
FIG. 4 shows an arrangement of three grids to sense movement vectors.
Figure 5:
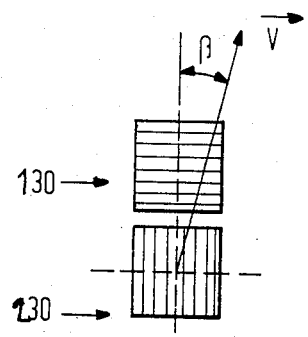
FIG. 5 shows an arrangement of two grids to sense movement vectors.

Two-dimensional movement, or vectorial directions, can readily be sensed by utilizing more than two grids 12, and arranging the respective grids at angles with respect to each other, for example three grids as shown in FIG. 4, or two grids at right angles, as shown in FIG. 5.

Embodiment of FIG. 4: Two grids 12 are located, respectively, on two sides of a grid 30 such that the symmetrical axes of the grids 12 intersect the axis of symmetry of the grid 30 by respective angles α. If the reference surface moves at velocity v with respect to the sensor—or the sensor with respect to the reference surface—along the movement vector $\vec{V}$, then the following signals are derived in accordance with FIGS. 2 and 3, in which the movement vector V is at an angle β with respect to the axis of symmetry of the grid 30. From grid 30:

$$f = Mv/G \cos \beta \text{ and } S = (v \cos \beta) \quad (2)$$

by subtraction, from grids 12:

$$f = 2Mv/G \sin \alpha \cdot \sin \beta \text{ and } S = (v \sin \beta) \quad (3)$$

The equations can be solved to obtain the value of the vector $\vec{V}$, the angle β as well as the sign S (forward or backward) of movement.

Embodiment of FIG. 5: The angle β can be determined by two grids which are arranged at 90° with respect to each other so that the angle α=90°, the grids being located adjacent each other and, for example, in the same optical field as the lens system 11. The vectorial angle of movement β is the angle between the axis of symmetry which intersects the two grid structures 130, 230 and passes through the center of the lower one of the two grids 30, as shown in FIG. 5. The output signals for the 90° grids, as in FIG. 5, then will be: the upper grid 130:

$$f = Mv/G \cdot \cos \beta \text{ and } S = (v \cdot \cos \beta) \quad (4)$$

the lower grid 230:

$$f = Mv/G \cdot \sin \beta \text{ and } S = (v \cdot \sin \beta) \quad (5)$$

By solving the equations, the required data for unambiguous determination of two-dimensional movement can be obtained.

The structural arrangement of the grids of FIGS. 4 and 5 can be in accordance with the grids 12 and 30 as described in FIGS. 2 and 3; alternatively, the grids can be monolithically integrated on a single chip.

Figure 6:
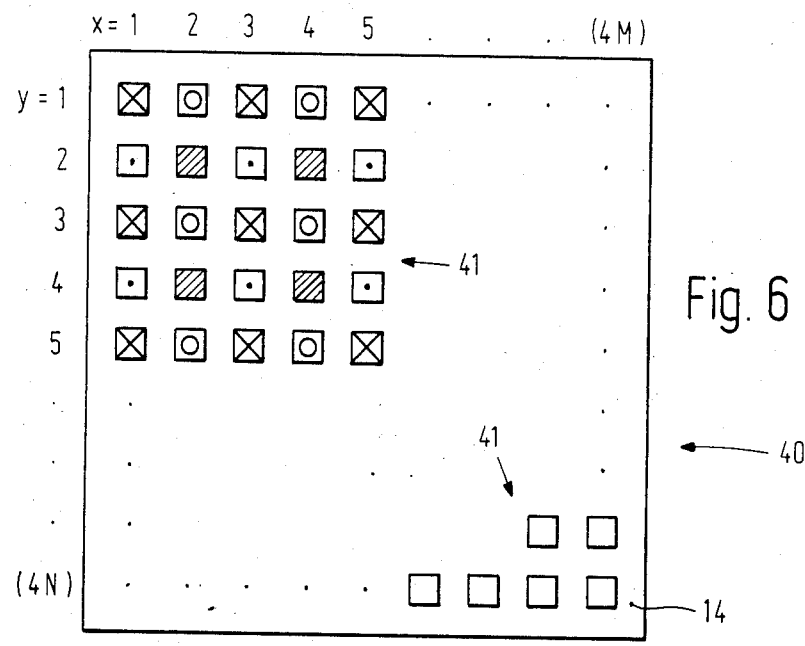
FIG. 6 shows a photo receiver structure in which diodes are located in form of a matrix.

Embodiment of FIG. 6: A grid structure 40 has a substrate 14 on which diffusion zones 41 are located in a matrix arrangement. A photo-responsive diode matrix is thus obtained. The rows Y=1, 2, 3 ... 4N and the columns X=1, 2, 3 ... 4M are shown in FIG. 6. The illustrations of the diodes is as follows:
diodes with cross: 2n+1; 2m+1
diodes with dot: 2n+2; 2m+1
diodes with circle: 2n+1; 2m+2
diodes hatched: 2n+2; 2m+2.

The respectively similarly designated diodes are electrically connected together, throughout the values m=0, 1, 2 to ... (2M−1) and n=0, 1, 2 ... to (2N−1). Only a few of those diodes 41 are shown in FIG. 6 to simplify the drawing.

The result will be a diode matrix having four outputs and a common substrate electrode 14. By subtraction or forming a difference, and amplification of the diodes, for example in accordance with the following equations:

$$i_1 = i(2n+1; 2m+1) + i(2n+1; 2m+2) - \quad (6)$$

$$i(2n+2; 2m+1) + i(2n+2; 2m+2)$$

and $$i_2 = i(2n+1; 2m+1) + i(2n+2; 2m+1) - \quad (7)$$

$$i(2n+1; 2m+2) + i(2n+2; 2m+2)$$

and solving, one can obtain two output signals to sense movement in a plane. Evaluation of the output signals can then be carried out similarly to the evaluation as described in connection with FIG. 5.

Figure 7:
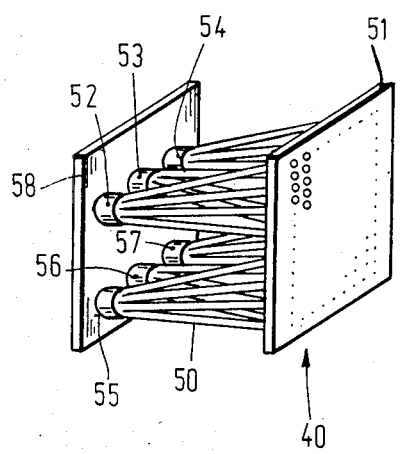
FIG. 7 shows a grid structure with light transmission by light guide fibers, cables, or elements.

Various changes and modifications may be made, and the matrix or grid arrangement need not be made by forming a transducer on a monolithic semiconductor substrate. The arrangement in accordance with FIG. 7 may also be used, in which, for example, the effect of the grid 40, in the matrix arrangement, is obtained by bundling light fibers which are positioned at the respective matrix locations illustrated in FIG. 6. The ends of a bundle light fiber cables 50 are located, in the matrix arrangement, on a plate 51 which is the imaging or grid plate of the optical system 11 (FIG. 1). The connection point of the grids in accordance with FIG. 6, or some other grid arrangement, for example as described in connection with FIGS. 1-5, is then obtained by carrying the light guide fibers 50 to respective photo diodes 52-57 which are located on a suitable support plate 58. Any type of grid structure, with any selected interdigited arrangement, or any matrix arrangement, can thus be obtained. If the arrangement of FIG. 6 is used, only four diodes need be utilized, since only four groups of separate matrix locations—crossed, dotted, circled or hatched—are there used.

It may be desirable to obtain particular recognition signals to provide specific data when movement is to be measured, for example to initially set an evaluation system, for first resetting or clearing information or the like. Such initial data can be obtained, for example, by placing a contrasting pattern, for example of bright or light strips on a dark background, which contains the required information in coded form, on the reference surface 10, and evaluating the outputs, for example as described in connection with FIG. 2. The output terminal 20 of the amplifier, then, can be used to evaluate the output and to effect the appropriate recognition which, then, can be suitably decoded in accordance with recognition criteria and entered into the evaluation system, for example as a start pulse, a clearing pulse, paper advance of a recorder, or the like.

Various other changes and modifications may be made, and features described in connection with any one of the embodiments may be used with any of the others, within the scope of the inventive concept.

We claim:

1. Contactless relative movement sensor system to determine relative movement between a sensor (11, 12, 13) and a reference surface (10), in which the sensor includes a grid structure (12, 30, 40) located in a grid plane, and optical means (11) imaging the surface (10) on the grid plane,
   wherein, in accordance with the invention,
   said grid structure comprises an electro-optical transducer means (13, 41, 50) arranged in a grid structure pattern, connected in the form of four interdigited comb-like grid structures, and positioned in said grid plane; and electrical means (18,24; 35-37) coupled to said transducer means and providing electrical output signals directly from said optical transducer means in said grid structure pattern, said electrical means comprising
- a first subtraction circuit (35) subtracting the outputs of a first and a third grid from each other;
- a second subtraction circuit (36) subtracting the outputs of a second and a fourth grid from each other; and
- a phase comparator (37) comparing the phases of the outputs of the first and second subtraction circuits to obtain an output signal representative of the direction of motion of the sensor with respect to the reference surface.

2. System according to claim 1, wherein said optical transducer means comprises a semiconductor substrate (14) and optically responsive semiconductor elements (13, 41) located on said substrate.

3. System according to claim 2, wherein said optically responsive semiconductor elements comprise photo diodes.

4. System according to claim 2, wherein said optically responsive semiconductor elements comprise photo transistors.

5. System according to claim 2, wherein said semiconductor substrate comprises a chip (14) of a first conductivity type on which said optically responsive semiconductor elements are formed as junctions of opposite conductivity type by monolithic integration thereon.

6. System according to claim 5, further comprising a grid pattern (15, 16, 31-34) applied over the optically responsive semiconductor element;
and connection windows of selected ones of said optically responsive elements to selected ones of said metallized strips.

7. System according to claim 1, wherein (FIG. 7) a support plate (51) is provided positioned in said grid plane;
and a plurality of light guide fibers (50) having end light pick-up elements located in a matrix pattern on said support plate:
and photoelectric receivers (52-57) receiving light from bundles of said light guide fibers in accordance with a predetermined pattern.

8. System according to claim 7, wherein the predetermined pattern comprises a series of grid-like strips.

9. System according to claim 7, wherein said predetermined pattern comprises a plurality of interdigited strips.

10. System according to claim 7, wherein said predetermined pattern comprises a plurality of strips extending in respectively mutually angled relationship.

11. System according to claim 7, wherein said predetermined pattern comprises a matrix pattern.

12. System according to claim 1, wherein the electro-optical transducer means are connected together to form two comb-like interdigited grids;
and the electrical means includes a subtraction circuit connected, respectively, to the outputs from the transducer means of the two interdigited grids, and subtracting the respective outputs therefrom to eliminate unvarying, or low-frequency signals from said transducer means.

13. System according to claim 12, wherein said subtraction circuit comprises two amplifiers (18, 22) connected in a negative feedback circuit;
and a coupling connection (21) connecting the output of one amplifier (18) with the input of the other (22).

14. System according to claim 13, including terminal means (20) connected to the output of said one amplifier (18) to derive an absolute value output signal therefrom.

15. Sensor system comprising two grid structures as claimed in claim 1, said grid structures having grid lines which are located at an angle ($\alpha$) with respect to each other.

16. Contactless relative movement sensor system to determine relative movement between a sensor (11, 12, 13) and a reference surface (10), in which the sensor includes a grid system (12, 30, 40) located in a grid plane, and optical means (11) imaging the surface (10) on the grid plane,
wherein, in accordance with the invention,
said grid system comprises an electro-optical transducer means (13, 41, 50) arranged in a grid structure pattern, connected together to form two comb-like interdigited grids, and positioned in said grid plane; and
electrical means (18,24; 35-37) coupled to said transducer means and providing electrical output signals directly from said optical transducer means in said grid structure pattern, said electrical means including a subtraction circuit connected, respectively, to the outputs from the transducer means of the two interdigited grids, and subtracting the respective outputs therefrom to eliminate unvarying, or low frequency signals from said transducer means;
further including two additional grid systems, wherein each additional grid system comprises four interdigited comb-like grids, and the electrical means connected to said additional grid system includes a first subtraction circuit substracting the outputs of a first and a third grid and proving a first output signal,
a second subtraction circuit subtracting the outputs of the second and fourth grid systems and providing a second output signal, and phase comparator means receiving the first and second output signals and providing an output representative to the direction of movement of the sensor with respect to the reference surface;
and wherein said two additional systems have grid directions, each, shifted by an angle ($\alpha$) with respect to the grid direction of said system having two interdigited comb-like grids.

17. System according to claim 1, wherein the optical transducer means are located in a grid matrix comprising four grids, said matrix including
m columns and n rows, where m=4M and N=4N, M and N being integers, and the optical transducer means are positioned in said rows and columns in four groups as follows:
2n+1; 2m+1;
2n+2; 2m+1;
2n+1; 2m+2;
2n+2; 2m+2;
wherein m=0, 1, 2, ... (2M−1);
and n=0, 1, 2 ... (2N−1);
and wherein said optical transducer means are connected to said groups, arranged in accordance with the foregoing relationships.

18. System according to claim 17, wherein said electro-optical transducer means comprises a silicon substrate chip (14) of a first conductivity type, and photoresponsive junctions located on said chip in a regular grid pattern;

and connection means (15, 16, 17) connecting the junctions in accordance with a selected pattern to said electrical means.

19. System according to claim 6, wherein said electro-optical transducer means comprises a silicon substrate chip (14) of a first conductivity type, and photoresponsive junctions located on said chip in a regular grid pattern;

and connection means (15, 16, 17) connecting the junctions in accordance with a selected pattern to said electrical means.

* * * * *